/ Patented July 19, 1938

2,124,505

UNITED STATES PATENT OFFICE 2,124,505

PROCESS FOR THE MANUFACTURE OF PYRIDINE-DERIVATIVES

Erich Haack, Radebeul, and Rudolf Freiherr von Buddenbrock, Dresden, Germany, assignors to Chemische Fabrik von Heyden A. G., Radebeul, near Dresden, Germany, a corporation of Germany No Drawing. Application May 28, 1934, Serial No. 727,980. In Germany May 27, 1933

10 Claims. (Cl. 260—38)

(Granted under the provisions of sec. 14, act of March 2, 1927; 357 O. G. 5)

This invention concerns novel acyl compounds, and more particularly combination products of pyridone and of quinolone imides free of hydrogen in the imidogroups and organic acid halides.

These new products are useful compositions, e. g., in the form of readily soluble resins; they are not readily affected by alkalies, as are the respective starting imides, and they serve a variety of other objects arising in organic chemistry or recognizable from the following description.

It is known, that the hydrogen-atom of the imido-group in N-methyl-2-pyridone-imide and N-methyl-2-quinolone-imide may be replaced by the benzoyl-group according to Schotten-Baumann by treating with benzoyl-chloride and alkali.

Now it has been found, that acyl-derivatives may also be obtained from N-substituted 2-pyridone- and quinolone-imides carrying no more hydrogen in the imido-group. Thus it is possible, when starting from 2-pyridone- and quinolone imides of the general formula

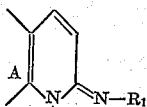

where

is a member of the group consisting of

and

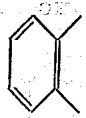

and wherein R and R' represent any organic radical, to make these compounds react with one molecule of an organic acid halide, the latter probably being combined additively with the imide double linking and acylated quaternary 2-amino-pyridines and -quinolines being formed.

This reaction may take place by mixing and stirring the components alone or in an indifferent solvent. The deep yellow colour of the pyridone- and quinolone-imides thus disappears and turns a lighter shade.

The products obtained are readily soluble in water, some of them also in solvents other than water. Contrary to the primary substances, 2-pyridone- and quinolone-imides, they are not separated off by alkali in moderate concentration.

Starting materials, from which our novel compositions are derived, may be obtained in various ways. Thus the imides referred to may be prepared in accordance with German Patents No. 595,361 and No. 608,137.

Example 1.—N-Methyl-2- pyridone-methyl-imide and benzoylchloride

The components, in molecular quantity, are stirred together while cooling well. A lightbrown resin forms, which is easily soluble in water.

Example 2.—N-Methyl-2- pyridone-methyl-imide and stearic acid chloride.

The components, in molecular proportions, are mixed in benzene solution. A light yellow solution forms while getting pretty warm. The benzene being evaporated, a yellowish resin remains, which is easily soluble in all of the usual solvents.

Example 3.—N-Methyl-2 - pyridone - benzylimide and acetyl chloride.

One mol. each of the components is stirred together while cooling well. A light brown resin is formed, which dissolves readily in water.

The following substances are made similarly.

Example 4.—N-Methyl-2 - pyridone - benzylimide and stearic acid chloride.

A yellow resin easily soluble in all of the usual solvents. The watery solution foams.

Example 5.—N-Methyl-2- pyridone - phenylimide and stearic acid chloride.

Molecular quantities of the components are heated so as to form a homogenous melt. When using larger quantities, it is necessary to cool from time to time. A light yellow, wax-like substance is obtained, which in its solubility resembles the substance as produced in Example 4.

Example 6.—N-Methyl-2- pyridone - phenylimide and benzoyl-chloride, or palmitic acid chloride.

Example 7.—N-Methyl-2-pyridone-p - phenyoxyphenyl-imide and stearic or oleic acid chloride.

Example 8.—N-Methyl-2-pyridone -β - Naphthylimide and stearic acid chloride.

Example 9.—N- Butyl - 2 - pyridone - p - ethoxy - phenyl-imide and stearic acid chloride

*Example 10.—N-Methyl-2-quinolone-phenylimide and stearic acid chloride.*

All these substances occur as light yellow to brownish resins or waxes and are readily soluble in all of the usual solvents. Their watery solutions foam, even when strongly diluted.

The distinctive characteristics pointed out in the foregoing description of the compounds of our invention, e. g., the exceptional foaming quality just referred to, render our compounds useful as foaming agents and in other applications.

What we claim is:

1. Process for the manufacture of pyridine derivatives, comprising allowing a compound selected from the group consisting of 2-pyridone and 2-quinolone imides of the formula

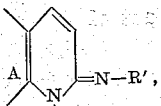

where

is a member of the group consisting of

and

R is an alkyl radical, and R' is a member of the group consisting of alkyl radicals, benzyl radicals, phenyl radicals and naphthyl radicals, to react with acid halides of the formula

X—OC—R'', wherein X is a halogen atom, and R'' is a member of the group consisting of the alkyl radicals and phenyl radicals.

2. Process for the manufacture of pyridine derivatives, comprising mixing, while cooling well, a compound selected from the group consisting of 2-pyridone and 2-quinolone imides of the formula

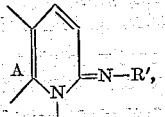

where

is a member of the group consisting of

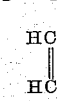

and

R is an alkyl radical, and R' is a member of the group consisting of alkyl radicals, benzyl radicals, phenyl radicals and naphthyl radicals, with acid halides of the formula X—OC—R'', wherein X is a halogen atom, and R'' is a member of the group consisting of alkyl radicals and phenyl radicals.

3. Process for the manufacture of pyridine derivatives, comprising melting a compound selected from the group consisting of 2-pyridone and 2-quinolone imides of the formula

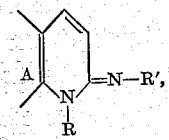

where

is a member of the group consisting of

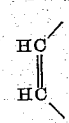

and

R is an alkyl radical, and R' is a member of the group consisting of alkyl radicals, benzyl radicals, phenyl radicals and naphthyl radicals, with acid halides of the formula X—OC—R'', wherein X is a halogen atom, and R'' is a member of the group consisting of alkyl radicals and phenyl radicals.

4. Process for the manufacture of pyridine derivatives comprising bringing together in a solvent a compound selected from the group consisting of 2-pyridone and 2-quinolone imides of the formula

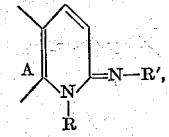

where

is a member of the group consisting of

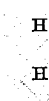

and

R is an alkyl radical, and R' is a member of the group consisting of alkyl radicals, benzyl radicals, phenyl radicals and naphthyl radicals with acid halides of the formula X—OC—R'', wherein X is a halogen atom, and R'' is a member of the group consisting of alkyl radicals and phenyl radicals.

5. Process for the manufacture of pyridine derivatives comprising bringing together in a solvent a compound selected from the group consisting of 2-pyridone and 2-quinolone imides of the formula

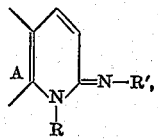

where

is a member of the group consisting of

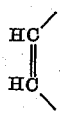

and

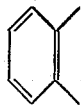

R is an alkyl radical, and R' is a member of the group consisting of alkyl radicals, benzyl radicals, phenyl radicals and naphthyl radicals, with acid halides of the formula X—OC—R'', wherein X is a halogen atom, and R'' is a member of the group consisting of alkyl radicals and phenyl radicals, the solvent being evaporated upon reaction.

6. Process for the manufacture of pyridine derivatives which comprises allowing to react quinolone-imides of the general formula

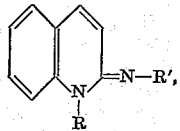

where R is an alkyl radical, and R' is a member of the group consisting of alkyl radicals, benzyl radicals, phenyl radicals and naphthyl radicals, with acid halides of the formula X—OC—R'', wherein X is a halogen atom, and R'' is a member of the group consisting of alkyl radicals and phenyl radicals.

7. The reaction product of a member of the group consisting of 2-pyridone and 2-quinolone imides of the formula

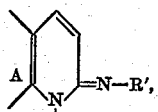

where

is a member of the group consisting of

and

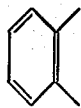

R is an alkyl radical, and R' is a member of the group consisting of alkyl radicals, benzyl radicals, and naphthyl radicals, with acid halides of the formula X—OC—R'', wherein X is a halogen atom, and R'' is a member of the group consisting of the alkyl radicals and phenyl radicals.

8. As a new article of manufacture the addition product of an N-alkyl-2-pyridone-alkylimide and the halogenide of an acid taken from the group of the alkyl carboxylic acids and the monocyclic aryl carboxylic acids.

9. As a new article of manufacture the addition product of an N-alkyl-2-pyridone-monocyclic-arylimide and the halogenide of an acid taken from the group of the monocyclic alkyl carboxylic acids and the aryl carboxylic acids.

10. As a new article of manufacture the addition product of an N-alkyl-2-pyridone-monocyclic-aralkylimide and the halogenide of an acid taken from the group of the alkyl carboxylic acids and the monocyclic aryl carboxylic acids.

ERICH HAACK.
RUDOLF FREIHERR v. BUDDENBROCK.